Nov. 20, 1951     L. A. KILGORE     2,575,716
TWO-SPEED POLYPHASE DYNAMOELECTRIC MACHINE
Filed Sept. 2, 1950
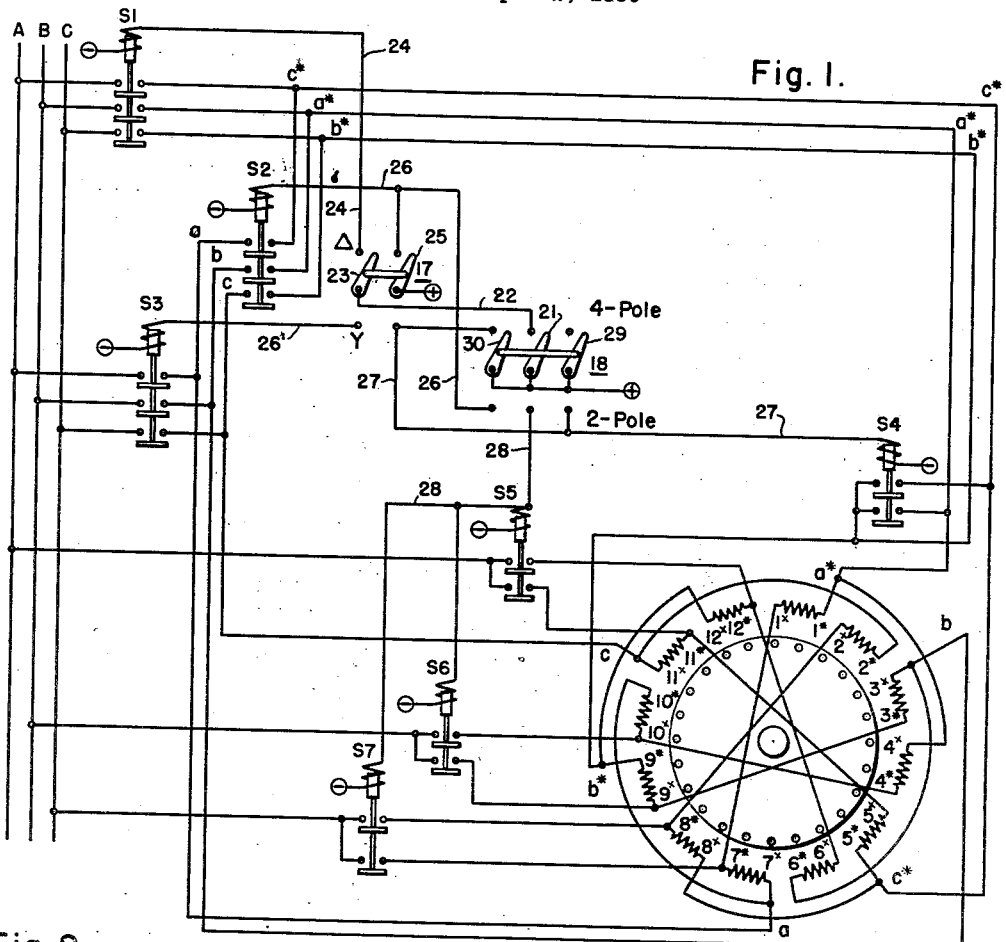
Fig. 1.
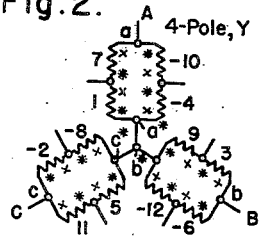
Fig. 2.
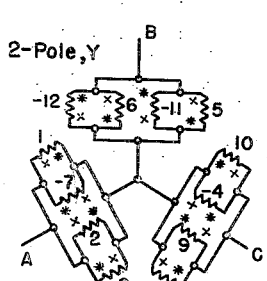
Fig. 3.
Fig. 4.
Fig. 5.
Fig. 6.
INVENTOR
Lee A. Kilgore.
BY O. B. Buchanan
ATTORNEY Patented Nov. 20, 1951

2,575,716

UNITED STATES PATENT OFFICE 2,575,716

TWO-SPEED POLYPHASE DYNAMO-ELECTRIC MACHINE

Lee A. Kilgore, Export, Pa., assignor to Westinghouse Electric Corporation, East Pittsburgh, Pa., a corporation of Pennsylvania Application September 2, 1950, Serial No. 183,001

4 Claims. (Cl. 318—224)

My invention relates to improvements in the switching-arrangements for polyphase, 2-speed, 2-to-1 pole number, induction-motors, synchronous motors, or other polyphase dynamo-electric machines, having four poles, or a multiple of four poles, for its high pole-number.

The principal object of my invention is to reduce the number of switching-poles which are necessary to change from one pole-number to the other, while retaining the advantages of 60-degree phase-belts or winding-groups, in a 3-phase motor.

My invention is an improvement over the consequent-pole change-speed induction-motors in which the winding was changed from a series arrangement to a two-parallel arrangement in which the direction of the current-flow was reversed in every other group of the winding for the low-speed connection, as described, for example, in an article by C. W. Kincaid in the Electric Journal for August 1924, page 357. This old consequent-pole connection, while requiring few switching-poles, had many serious disadvantages, including even harmonics, which cause extra losses and noise, and a higher leakage reactance and a lower distribution-factor than a 60° phase-belt 3-phase winding.

My present invention is also an improvement over previously known 60° phase-belt 3-phase windings, such as were described in the Lewis Patent 1,495,420, granted May 27, 1924, in which a very large number of contactor-poles were used, in a complicated wiring-arrangement, as distinguished from the simple change-over connections which are necessary, if a commercially practicable two-speed motor is to be produced.

In general, my new motor or dynamo-electric machine is characterized by using permanently closed rings, each consisting of four phase-belts or winding-groups, and by making connections to these rings so as to provide a two-parallel winding for the four-pole connection, and a four-parallel winding for the two-pole connection.

While my invention is susceptible of embodiment in a number of different forms, I have illustrated two of the simplest forms of embodiment in the accompanying drawings, in a 4/2-pole motor, which is intended to be representative of any multiples of these pole-members, which are obviously obtainable by mere duplication or repetition of the winding-poles which are illustrated. While my invention is not limited to 3-phase motors, or to motors as distinguished from generators, by far the most important field of application of my invention is in 3-phase motors, and so I have illustrated my invention as a 3-phase motor, with the understanding that this illustration is not to be taken in a limiting sense.

In the accompanying drawing, Fig. 1 is a diagrammatic view of circuits and apparatus of a 4/2-pole 3-phase squirrel-cage induction-motor, with all switching and control-connections necessary for producing either a two-pole four-parallel Y or star-connection, a four-pole two-parallel Y or star connection, or a four-pole two-parallel delta-connection, Fig. 2 is a diagrammatic view of the four-pole two-parallel star-connection, Fig. 3 is a similar view of the two-pole four-parallel star-connection, Fig. 4 is a similar view of the four-pole two-parallel delta-connection, and Figs. 5 and 6 are developed diagrammatic views illustrative of the energization of the twelve phase-belts or winding-groups, necessary to produce a 3-phase four-pole machine, and a 3-phase two-pole machine, respectively.

In Fig. 1, I have illustrated the application of my invention in a 3-phase squirrel-cage induction-motor, although it is also applicable to synchronous motors and generators. In the illustrated machine, the primary winding consists of twelve identical phase-belts or winding-groups, following each other consecutively around the circumference of the primary winding, and numbered consecutively from 1 to 12, with polarity-marks × and * to indicate the beginning and end, respectively, of each winding-group. A developed view of the primary winding is again indicated in each of Figs. 5 and 6, to which have been added arrows showing the direction of the current-flow of the 3-phase currents A, B and C, which are necessary to make four poles and two poles, respectively.

It will be understood, of course, that the numbering of the consecutive winding-groups 1 to 12 can be started at any winding-group, and that the lettering of the phases A, B and C can be started by calling any phase A, and the other two phases B and C, in either phase-sequence. It is also to be understood that the phases A, B and C, which are indicated in Figs. 5 and 6, can be either star-phases or delta-phases, the letters A, B and C here indicating only that the chosen "principal" phase is marked A, the next lagging (or leading) phase is marked B, and the third phase is marked C.

It will be noted, from a comparison of Figs. 5 and 6, that one of the winding-groups has the phase-A current flowing in it, in the same direction, in both the four-pole arrangement and the two-pole arrangement, and I have arbitrarily chosen the convention of assigning the number 1 to this particular winding-group. In the following description and claims, this numbering-convention will be used, with the understanding, however, that any other system of numbering or lettering might have been chosen.

An examination of Fig. 5 will show that, for the four-pole arrangement, the phase-A current will flow in the same direction in the winding-groups 1 and 7, and will flow in the reverse direction in the winding-groups 4 and 10. This will make the winding-groups 1 and 7 produce north poles at a given instant, while the winding-groups 4 and 10 produce south poles at the same instant. Similar observations can be made for the other two phase-currents B and C, with appropriate changes in the numbering of the winding-groups. It will be noted that each winding-group, in the four-pole arrangement of Fig. 5, will have a belt-width of 60°, or 1/12 of four poles of 180° each.

Reference to Fig. 6 will show that the first two winding-groups 1 and 2 have the phase-A current flowing therein in the same direction, while the seventh and eighth winding-groups have the phase-A current flowing therein in the reverse direction, thus making groups 1 and 2 together produce a north pole at the same instant when the groups 7 and 8 together produce a south pole. Here, again, a 60° phase-belt is produced by the two winding-groups 1 and 2 together, and by the two winding-groups 7 and 8 together.

If the phase which I have marked B had been chosen as the "principal" phase, and marked A, in both Figs. 5 and 6, then phase-winding 12 would have been marked 1, but the ending-terminal* of the phase-winding would become an entrance-terminal, and the order of sequence of the numberings would therefore be reversed, thus making group 11 have the number 2, group 10, 3, and so on. In this way, the first two groups of the new numbering would carry the phase-A current in Fig. 6.

A comparison of Figs. 5 and 6 will show that, in changing from the four-pole arrangement of Fig. 5 to the two-pole arrangement of Fig. 6, the phase-A current flows in both of the winding-groups 1 and 7 in both figures, but with the direction of current-flow reversed in Fig. 6, as compared to Fig. 5. Thus, I can connect the winding-groups 7 and 1 in series with each other, in Fig. 5, bringing the phase-A current into the beginning of group 7, thence to the beginning of group 1, and finally out of the end of group 1, for the four-pole connection of Fig. 5. Then, for the two-pole connection of Fig. 6, I can bring the phase-A current into the junction-point between the end of group 7 and the beginning of group 1. In this way, I will have effected a reversal of the current-direction in the winding-group 7, without changing the current-direction in the winding-group 1.

A further comparison of Figs. 5 and 6 will show that, while the phase-A current flows in the winding-groups 4 and 10 in the four-pole arrangement of Fig. 5, the same winding-groups 4 and 10 are traversed by the phase-C current in the two-pole arrangement of Fig. 6, but with the polarity or direction of current-flow reversed in the winding-group 10. Consequently, for the four-pole connection of Fig. 5, I connect the winding-groups 10 and 4 in series, with the phase-A current entering at the end of group 10, and thence passing on to the end of group 4, and leaving at the beginning of group 4. For the two-pole arrangement of Fig. 6, I bring the phase-C current into the junction-point between the groups 10 and 4, so that the phase-C current enters group 10 at its beginning, and enters group 4 at its ending, thus effecting the necessary current-reversal or polarity-reversal of the coil 10.

These four phase-A coils, 1, 7, 10 and 4, of the four-pole connection of Fig. 5, are thus permanently connected together in a closed loop, as is shown in Figs. 1, 2 and 4. For the four-pole connection of Fig. 4, the phase-A current is brought in at the junction-point $a$, between groups 7 and 10, and the phase-A current is brought out at the junction-point $a^*$ between groups 4 and 1. For the two-pole connection, the phase-A current is brought in at the junction-point between the beginning of group 1 and the ending of group 7, while the phase-C current is brought in at the junction-point between the ending of group 4 and the beginning of group 10. Adding eight to the number of each of the four winding groups 1, 7, 10 and 4 of phase-A, will produce the phase-B loop, consisting of winding-groups 9, 3, 6 and 12 (subtracting 12 whenever the number exceeds 12). Adding eight more, produces the phase-C closed ring or loop, consisting of the winding-groups 5, 11, 2 and 8. Appropriate changes will be made, of course, in the lettering of the phase-currents and terminals, for the respective four-winding loops.

Expressed more generically, whatever the number of phases, and whatever the multiple of four poles for the high pole-number of the winding, there is one phase-belt or winding-group per phase per pole of the slow-speed (high-pole-number) connection. There are permanent connections forming a separate closed ring of four winding-groups per phase per four poles of the primary winding; each ring forms two parallel circuits for each group of four poles of the high-pole-number connection; one of these two parallel circuits consists of two serially connected winding-groups, such as 7 and 1, which are similarly situated in two different north poles at any given instant; and the other parallel circuit of each ring consists of two winding-groups, such as 10 and 4, which are serially connected in the opposite polarity, and which are similarly situated in two different south poles at the aforesaid instant. For the slow-speed, or high-pole-number, connection, each of the aforesaid pairs of parallel circuits is energized from its own proper phase. For the high-speed, or low-pole-number, connection, the two intermediate junction-points, between the winding-groups which were in series with each other in the high-speed connection, are energized from the polyphase supply, to make a four-parallel connection for each phase, for the low-pole-number connection of the primary winding.

If the motor has 8 poles, or 12 poles, or any other multiple of 4 poles, for its high-pole-number connection, then it is not necessary that the twelve phase-belts or winding-groups which are consecutively numbered 1 to 12 shall all be within four consecutive poles of the high-pole-number connection. The consecutively numbered groups 1 to 12 should have the same phase-relations as if said groups followed each other consecutively under the first four poles of the motor, but group 4, for example, could be under the sixth pole instead of the second pole, and group 10, for example, could be under the eighth or twelfth pole instead of the fourth pole. These are only examples.

Fig. 1 shows preferred control and switching-circuits for a 3-phase four-pole motor, embodying a double-throw selector-switch 17, a double-throw starting-switch 18, and seven electromagnetic contactors, circuit-breakers, or other switches, numbered from S1 to S7.

The selector-switch 17 has an upper position, for causing the slow-speed or four-pole connections to be in delta, as shown in Fig. 4, and a lower position for causing said connections to be in Y or star, as shown in Fig. 2. The starting-switch 18 has an upper position, for making the four-pole connection, either in delta or Y, according to the position of the selector-switch 17, and the starting-switch has also a lower position for making the two-pole connection, which will be a four-parallel Y-connection, as shown in Fig. 3.

When the starting-switch 18 is in its upper position, its switch-blade 21 energizes a circuit 22 which is connected to a switch-blade 23 of the selector-switch 17. When this selector-switch is in its upper position, said switch-blade 23 energizes a delta-connection circuit 24, which energizes the relay or contactor-switch S1. The switch S1 thereupon connects one line-phase, such as A, to the junction-point $c^*$ of the primary winding of the motor; it also connects the next line-phase, such as B, to the junction-point $a^*$ of the primary winding of the motor; and it also connects the third supply-phase, such as C, to the junction-point $b^*$.

The selector-switch 17 is a two-pole switch, having a second switch-blade 25 which, in its upper position, energizes a conductor 26, which energizes the contactor-switch S2, which thereupon connects the winding-point $a$ to $c^*$, $b$ to $a^*$ and $c$ to $b^*$.

With the starting-switch 18 still in its upper or four-pole position, but with the selector-switch 17 in its lowermost or Y-connection position, the switch-blade 23 energizes a conductor 26'; which energizes a contactor-switch S3 which connects the respective supply-phases A, B and C to the junction-points $a$, $b$ and $c$ of the motor-winding. The second switch-blade 25, in its lower position, energizes a conductor 27, which energizes the contactor-switch S4 which makes a star-point connection between the three junction-points $a^*$, $b^*$ and $c^*$ of the motor-winding.

When the starting-switch 18 is moved to its lower position, its switch-blade 21 energizes a conductor 28, which energizes the three remaining contactor-switches S5, S6 and S7. The contactor-switch S5, when energized, connects one of the supply-phases, such as A, to the motor-winding points 12* and 11*, respectively; the contactor-switch S6, when energized, connects the next supply-phase, such as B, to the motor-winding points 10ˣ and 9*, respectively; while the contactor-switch S7, when energized, connects the third supply-phase, such as C, to the motor-winding points 8* and 7*, respectively, thus completing the 2-pole supply-line connections. These 2-pole supply-phases A, B and C are not necessarily the same as the 4-pole supply-phases A, B and C. Any line-phase may be designated as the "principal" phase A, in either case.

The starting-switch 18 is a three-pole switch, having a second switch-blade 29, which, in its lower position, energizes the previously-mentioned circuit 27, which energizes the star-connection contactor S4 for the junction-points $a^*$, $b^*$ and $c^*$. The starting-switch 18 has a third switch-blade 30, which, in its lower position, energizes the previously mentioned circuit 26, which energizes the contactor S2 for connecting the winding-points $a$, $b$ and $c$ to the star-connected junction-points $c^*$, $a^*$ and $b^*$.

It will be understood, of course, that it may not always be necessary or desirable to provide a selector-switch 17 for giving the operator a choice between a delta-connection and a Y-connection for the four-pole motor-winding connection.

If the delta four-pole connection is to be exclusively used, as shown in Fig. 4, the selector-switch 17 would always be left in its uppermost position, so that it would effect a permanent connection between the conductors 22 and 24; and it would also permanently energize the conductor 26 and the contactor-switch S2, so that there would be permanent connections between the points $a$ and $c^*$, $b$ and $a^*$, and $c$ and $b^*$, respectively, and this contactor-switch S2 could therefore be omitted. When the selector-switch 17 is always left in its upper position, it could obviously be omitted; and the conductor 25 and the contactor-switch S4 would not be used at all, and could also be omitted.

If the Y-type four-pole connection is to be exclusively used, as shown in Fig. 2, the selector-switch 17 would always be left in its lowermost position, which would have the effect of permanently joining the conductors 22 and 26' permanently energizing the conductor 27 for the star-point contactor-switch S4 and permanently cutting out the conductor 14 and the contactor-switch S1, which could, accordingly, be omitted. Since the star-point contactor-switch S4 would thus always be energized (when the four-pole Y-connection is used to the exclusion of the four-pole delta-connection), then it is obvious that the star-point connection of the three junction-points $a^*$, $b^*$ and $c^*$ could be permanently made, without using said contactor switch S4.

It will thus be seen that I can change from the two-pole, four-parallel, Y-connection of Fig. 3, to the four-pole, two-parallel, Y-connection of Fig. 2, by using only five contactor-switches, namely S2, S3, S5, S6 and S7, having a total of twelve poles. On the other hand, I can change from said two-pole, four-parallel, Y-connection of Fig. 3, to the four-pole, two-parallel, delta-connection of Fig. 4, by using only the five contactor-switches S1, S4, S5, S6 and S7, having a total of eleven poles.

In the simplified diagram which is shown in Fig. 1, I have not undertaken to show any switch-interlocking means or any switch-sequence means. It will be obvious that, by opening and closing the various switches in the proper sequence, only a relatively small number of these switches may be used for effecting a current-interruption, the remaining switches which were in service being opened after the opening of the circuit-interrupting switches, thus effecting a saving in the number of switches which have to be built for heavy current-interrupting duty.

While I have given only three illustrative motor-winding connections, all in a 3-phase motor, I wish it to be understood that I am not limited altogether to these particular connections, or to this particular phase-number, as the general principles of my invention are applicable to other connections and other phase-numbers, as has been explained. I desire, therefore, that the appended claims shall be accorded the broadest construction consistent with their language.

I claim as my invention:

1. A polyphase two-speed, 2-to-1 pole-number, dynamo-electric machine having $4n$ poles for its high pole-number, where $n$ is an integer; characterized by a primary winding having a plurality of identical winding-groups following each other consecutively around the circumference of the primary winding; permanent group-connections forming a separate ring of four winding-groups per phase per four poles of the $4n$ pole-number, each ring forming two parallel circuits for said $4n$ pole-number, one of said two parallel circuits of each ring consisting of two serially connected winding-groups which are similarly situated in two different north poles at any given instant, and the other parallel circuit of each ring consisting of two winding-groups which are serially connected in the opposite polarity and which are similarly situated in two different south poles at the aforesaid instant; slow-speed polyphase switching-means for energizing each of the aforesaid pairs of parallel circuits from its own proper phase to make the $4n$-pole connection of the primary winding; and high-speed polyphase switching-means for energizing the two intermediate junction-points between the winding-groups which were in series with each other in the $4n$-pole connection, to make a four-parallel connection for each phase for the $2n$-pole connection of the primary winding.

2. A two-speed, three-phase, 2-to-1 pole-number, dynamo-electric machine, characterized by a primary winding having one or more repeatable parts: each repeatable part of the primary winding consisting of twelve consecutively numerable, identical, winding-groups having the same phase-relations as if said twelve winding-groups followed each other consecutively around the circumference of the primary winding; permanent group-connections forming three separate rings of winding groups as follows: 1, 7, 10, 4, and back to 1; 9, 3, 6, 12, and back to 9; and 5, 11, 2, 8, and back to 5; slow-speed three-phase switching-means for energizing the first ring with one phase, entering between 7 and 10 and leaving between 4 and 1, for energizing the second ring with the next phase, entering between 3 and 6 and leaving between 12 and 9, and for energizing the third ring with the third phase, entering between 11 and 2 and leaving between 8 and 5; and high-speed star-connection three-phase switching-means for entering between 6 and 12, and between 5 and 11, with one phase, for entering between 10 and 4, and between 9 and 3, with the next phase, for entering between 2 and 8, and between 1 and 7, with the third phase, and for making a common star-point connection for all of the other terminals of the twelve winding-groups.

3. A two-speed, three-phase, 2-to-1 pole-number, dynamo-electric machine, characterized by a primary winding having one or more repeatable parts: each repeatable part of the primary winding consisting of twelve consecutively numerable, identical, winding-groups having the same phase-relations as if said twelve winding-groups followed each other consecutively around the circumference of the primary winding; permanent group-connections forming three separate rings of winding-groups as follows: 1, 7, 10, 4, and back to 1; 9, 3, 6, 12, and back to 9; and 5, 11, 2, 8, and back to 5; permanent connections between the junction-points 1—4 and 3—6, between the junction points 9—12 and 11—2, and between the junction-points 5—8 and 7—10; slow-speed delta-connection three-phase switching-means for entering at the connection between the junction-points 7—10 and 8—5, with one phase, for entering at the connection between the junction-points 3—6 and 4—1, with the next phase, and for entering at the connection between the junction-points 11—2 and 12—9, with the third phase; and high-speed star-connection three-phase switching-means for entering between 6 and 12, and between 5 and 11, with one phase, for entering between 10 and 4, and between 9 and 3, with the next phase, for entering between 2 and 8, and between 1 and 7, with the third phase, and for making a common star-point connection for all of the other terminals of the twelve winding-groups.

4. A two-speed, three-phase, 2-to-1 pole-number, dynamo-electric machine, characterized by a primary winding having one or more repeatable parts: each repeatable part of the primary winding consisting of twelve consecutively numerable, identical, winding-groups having the same phase-relations as if said twelve winding-groups followed each other consecutively around the circumference of the primary winding; permanent group-connections forming a two-parallel star-connection, of which one phase is serially through first 7 and then 1 to the star-point and in the reverse direction serially through first 10 and then 9 to the star-point, another phase is serially through first 3 and then 9 to the star-point and in the reverse direction serially through first 6 and then 12 to the star-point, and the third phase is serially through first 11 and then 5 to the star-point and in the reverse direction serially through first 2 and then 8 to the star-point; slow-speed three-phase switching-means for connecting the three-phases of a three-phase supply-line to the respective phase-terminals of the said two-parallel star-connection; and high-speed, four-parallel star, three-phase switching-means for entering between 6 and 12, and between 5 and 11, with one phase, for entering between 10 and 4, and between 9 and 3, with the next phase, for entering between 2 and 8, and between 1 and 7, with the third phase, and for joining the three-phase-terminals of the two-parallel star-connection to the star-point of said two-parallel star-connection.

LEE A. KILGORE.

No references cited.